United States Patent [19]

Pav et al.

[11] Patent Number: 4,848,119
[45] Date of Patent: Jul. 18, 1989

[54] SYSTEM OF ROLLS FOR USE IN CALENDERS AND LIKE MACHINES

[75] Inventors: Josef Pav; Reinhard Wenzel, both of Krefeld, Fed. Rep. of Germany

[73] Assignee: Kleinewefers GmbH, Krefeld, Fed. Rep. of Germany

[21] Appl. No.: 35,647

[22] Filed: Apr. 7, 1987

[30] Foreign Application Priority Data

Apr. 9, 1986 [DE] Fed. Rep. of Germany ....... 3611859
Dec. 23, 1986 [DE] Fed. Rep. of Germany ....... 3644170

[51] Int. Cl.$^4$ .................... B21B 37/08; B21B 27/02
[52] U.S. Cl. .................. 72/20; 29/113 AD; 29/116 AD; 72/245; 100/162 B; 100/170
[58] Field of Search ............ 72/243, 245, 8, 20; 29/113 R, 113 AD, 116 R, 116 AD; 100/162 B, 170

[56] References Cited

U.S. PATENT DOCUMENTS

| | | |
|---|---|---|
| 3,884,140 | 5/1975 | Christ et al. |
| 3,997,953 | 12/1976 | Christ et al. ............ 29/116 AD |
| 4,058,877 | 11/1977 | Lehmann ............... 29/116 AD |
| 4,213,232 | 7/1980 | Biondetti et al. |
| 4,290,351 | 9/1981 | Pav et al. |
| 4,311,091 | 1/1982 | Pav et al. |
| 4,319,389 | 3/1982 | Marchioro |
| 4,327,468 | 5/1982 | Kusters et al. ........ 29/116 AD |
| 4,328,744 | 5/1982 | Pav et al. |
| 4,394,793 | 7/1983 | Pav et al. |
| 4,414,890 | 11/1983 | Schiel et al. ........ 29/116 AD X |
| 4,435,971 | 3/1984 | Schuwerk ............ 29/113 AD X |
| 4,440,077 | 4/1984 | Schiel .................. 29/116 AD |
| 4,457,057 | 7/1984 | Pav |
| 4,458,517 | 7/1984 | Schuwerk ............ 29/116 AD X |
| 4,514,887 | 5/1985 | Rauf et al. ............ 29/116 AD |
| 4,620,348 | 11/1986 | Guttinger |
| 4,651,552 | 3/1987 | Ahrweiler .......... 29/116 AD X |
| 4,709,571 | 12/1987 | Guttinger ............ 72/245 X |

FOREIGN PATENT DOCUMENTS

| | | |
|---|---|---|
| 2826316 | 8/1980 | Fed. Rep. of Germany. |
| 3049080 | 7/1982 | Fed. Rep. of Germany. |
| 3138365 | 4/1983 | Fed. Rep. of Germany. |
| 3325385 | 1/1985 | Fed. Rep. of Germany. |
| 3416210 | 11/1985 | Fed. Rep. of Germany. |
| 2226508 | 11/1974 | France. |
| 2339094 | 8/1977 | France. |
| 2441087 | 6/1980 | France. |
| 1544658 | 4/1979 | United Kingdom. |
| 2158196 | 11/1985 | United Kingdom. |

Primary Examiner—Robert L. Spruill
Assistant Examiner—Steven B. Katz
Attorney, Agent, or Firm—Peter K. Kontler

[57] ABSTRACT

A roll for use in the system of rolls of a calender has a stationary carrier which is surrounded by a deformable hollow cylindrical shell movable radially relative to the carrier and having end portions which surround and are rotatable relative to rings which are also movable relative to the carrier in the radial direction of the shell. The rings can be arrested in selected positions with reference to the carrier by pairs of hydraulic cylinder and piston units which are connected with the outlets of pumps or with the outlet of a single pump by conduits containing shutoff valves. Refilling devices are provided to compensate for leakage of fluid from the chambers. The shell is deformable by rows of hydrostatic supporting elements which react against the carrier and bear against the internal surface of the shell.

20 Claims, 7 Drawing Sheets

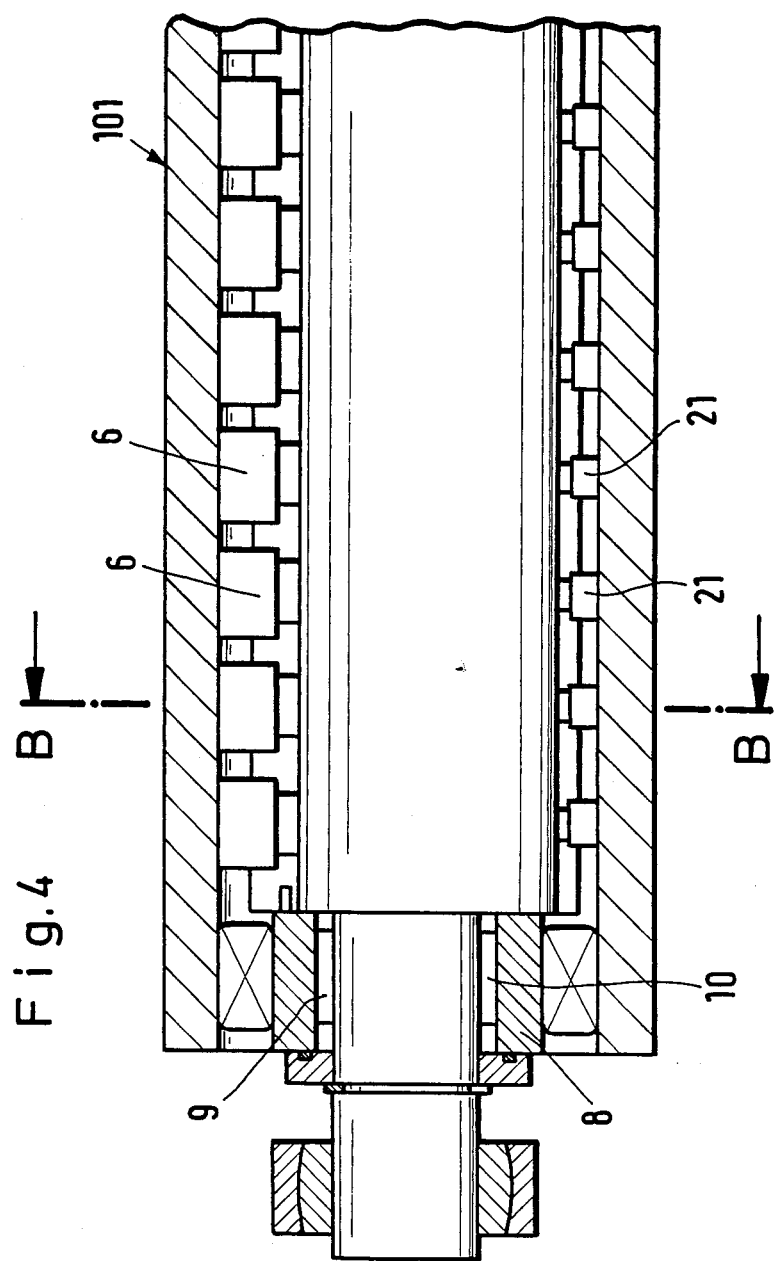

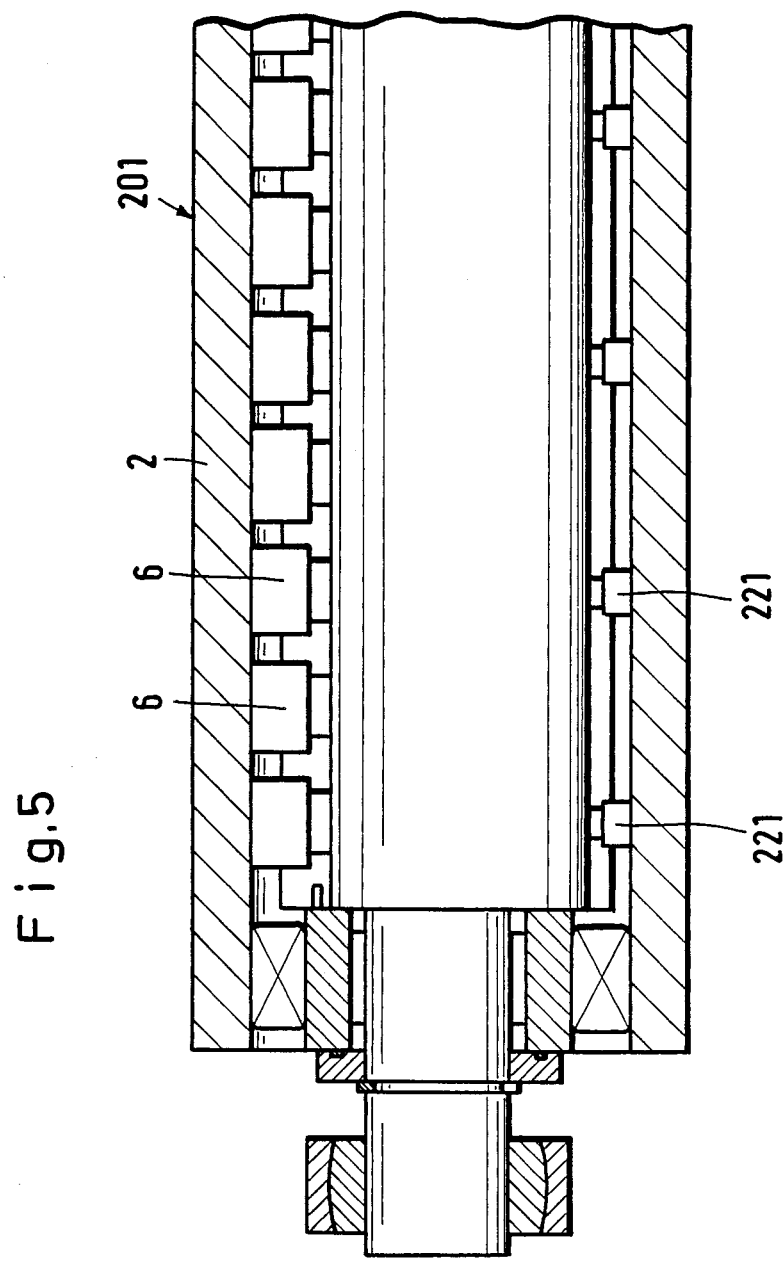

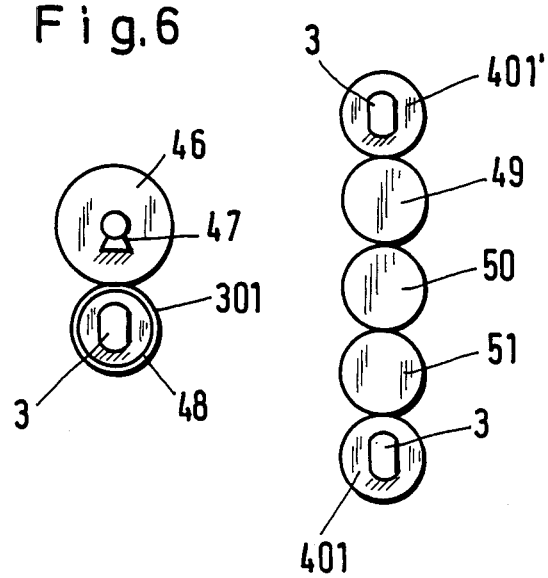

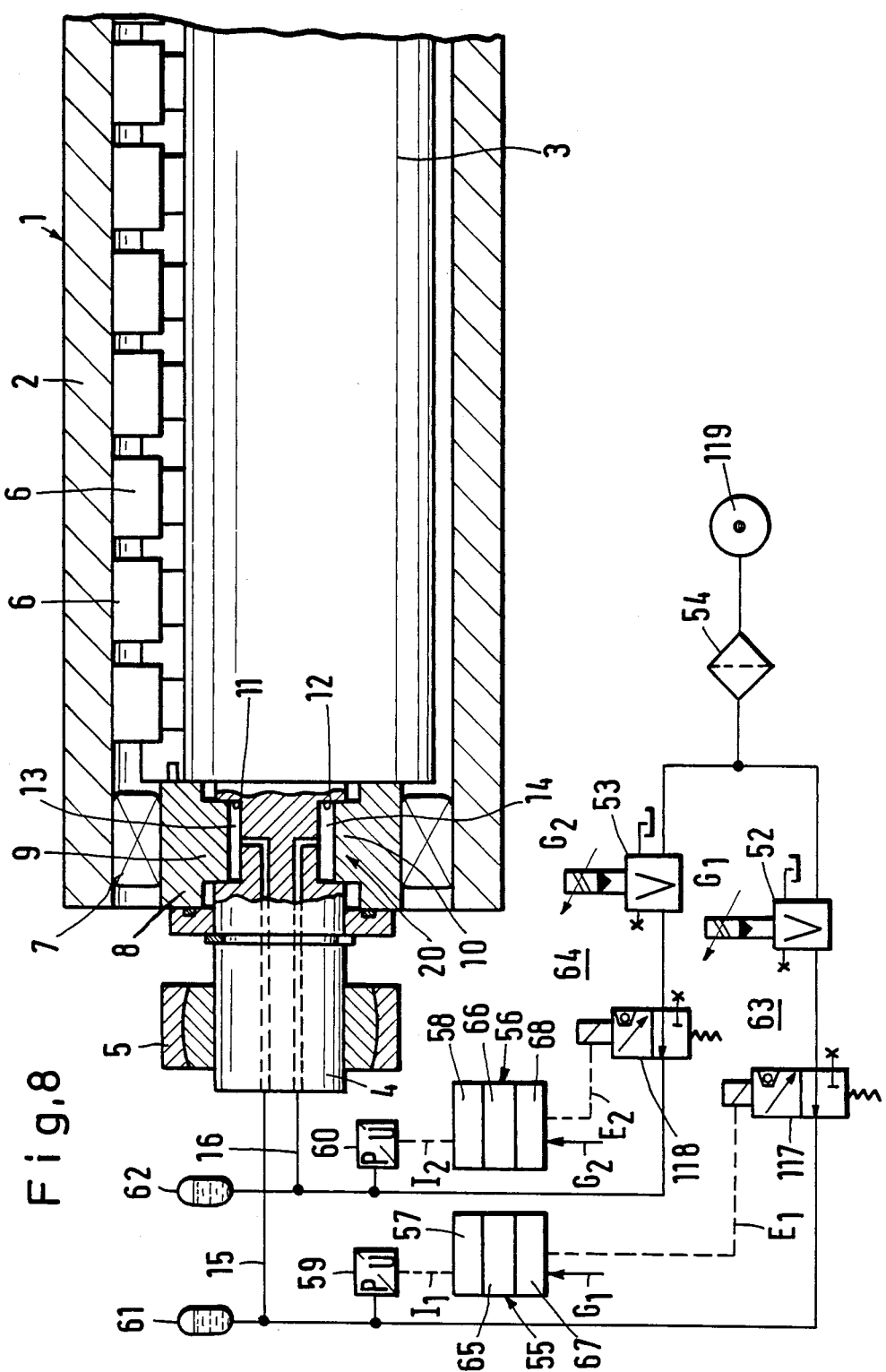

SYSTEM OF ROLLS FOR USE IN CALENDERS AND LIKE MACHINES

CROSS-REFERENCE TO RELATED CASE

Certain rolls and systems of rolls which are disclosed in the present application are identical with or similar to certain rolls and systems of rolls described and shown in the commonly owned copending patent application Ser. No. 035,635 filed April 7, 1987 for "System of rolls for use in calenders and like machines". Somewhat similar rolls are further disclosed in commonly owned copending patent application Ser. No. 927,808 filed Nov. 6, 1986 for "Roll for use in calenders and the like".

BACKGROUND OF THE INVENTION

The invention relates to improvements in rolls and in systems of rolls for use in calenders (including supercalenders) and like machines for the treatment of running webs of paper, textile, metal or plastic material. More particularly, the invention relates to improvements in systems of rolls wherein at least one roll has a deformable hollow cylindrical shell which surrounds and is movable radially and can rotate relative to a stationary carrier, and wherein selected portions of the shell can be deformed by one or more rows of supporting elements serving to regulate the width of the nip of the shell with an adjacent roll as well as the force which is applied to selected portions of the running web. Still more particularly, the invention relates to improvements in systems of rolls wherein the end portions of the shell of at least one roll surround and are rotatable relative to as well as movable radially with annular members in the form of rings or the like.

Commonly owned German Offenlegungsschrift No. 33 25 385 discloses a system of rolls wherein at least one roll is constructed and assembled in the above outlined manner. The means for actually supporting the shell of the one roll includes rows of primary and secondary hydrostatic supporting elements which react against the carrier and have exposed surfaces indirectly acting against the internal surface of the shell with the interposition of films of a fluid medium. The end portions of the shell are free to move radially with reference to the adjacent portions of the carrier. The purpose of annular members in the end portions of the shell is to carry seals which cooperate with sealing rings on the carrier. The profile of the shell can be regulated by appropriate selection of pressures which are applied to the supporting elements by hydraulic cylinder and piston units to ensure that the width of the nip will match a desired value and that the pressure which is applied to the web running through the nip will be distributed in a preselected way. When the shell is in a state of equilibrium, the sum of forces which are transmitted thereto by the load plus the secondary supporting elements matches the sum of forces which are applied by the primary supporting elements.

A modified roll for use in systems of rolls for calenders or the like is disclosed in commonly owned German Offenlegungsschrift No. 34 16 210. The main difference between the roll which is disclosed in this publication and the previously discussed roll is that the roll of the Offenlegungsschrift No. 34 16 210 comprises ring-shaped annular members which are disposed at the ends of the shell and are held against any movement relative to the carrier, i.e., the end portions of the shell are also held against any movement with reference to the respective end portions of the carrier. This is desirable and advantageous in certain types of machines wherein the axes of the end portions of the shell should, or must, be maintained at a fixed distance from the axis of the carrier. Moreover, this renders it possible to accurately locate the ends of a nip which is defined by the shell with a neighboring roll of the system. However, rigid mounting of the end portions of the shell often interferes with, or actually prevents, the shifting of the shell to an optimum position by way of the supporting elements which are confined in the shell and react against the carrier. This will be readily appreciated since the supporting elements can influence only that part of the shell which is located between the fixedly mounted annular members, i.e., only the intermediate portion of the shell.

Further conventional rolls are disclosed in German Offenlegungsschrift No. 30 49 080 of Schiel et al. and in German Auslegeschrift No. 28 26 316 of Biondetti et al.

OBJECTS AND SUMMARY OF THE INVENTION

An object of the invention is to provide a novel and improved system of rolls which can be used in calenders (including supercalenders) and like machines and is constructed and assembled in such a way that at least one of its rolls can be adjusted and held in a selected position of adjustment in a novel and improved way.

Another object of the invention is to provide a system of rolls wherein at least one of the rolls constitutes an improvement over and a further development of rolls which are disclosed in the aforementioned printed German patent applications of the assignee.

A further object of the invention is to provide a roll which can be used in a calender or in a like machine and wherein the end portions of the hollow cylindrical shell of such roll can be moved to and reliably held in any one of a practically infinite number of different positions.

An additional object of the invention is to provide a roll which is less likely to be heated to an elevated temperature than a conventional roll.

Still another object of the invention is to provide a roll which can be rotated in response to consumption of small amounts of energy and which can be used in existing calenders and like machines as a superior substitute for heretofore known rolls.

Another object of the invention is to provide a novel and improved method of reducing the heating action upon, and the energy requirements of, the above outlined roll.

A further object of the invention is to provide a roll wherein friction between at least some of the supporting elements and the shell is less pronounced than in heretofore known rolls.

An additional object of the invention is to provide a machine which embodies a system of rolls including at least one roll of the above outlined character.

One feature of the invention resides in the provision of a system of rolls which can be used in calenders and like machines. The system comprises at least two neighboring rolls which define an elongated nip, and at least one of the rolls comprises an elongated carrier, a deformable hollow cylindrical shell which rotatably surrounds the carrier and is movable radially relative to the carrier, first and second substantially annular supports which are interposed between the carrier and the end portions of the shell and are movable with the end portions of the shell relative to the carrier in the radial direction of the shell between a plurality of different positions, and means for arresting the supports in selected positions with reference to the carrier.

The shell is rotatable relative to the carrier as well as with reference to the supports, and the one roll preferably further comprises at least one row of first hydrostatic supporting elements which are interposed between the carrier and the shell adjacent the nip, at least one row of second hydrostatic supporting elements which are interposed between the shell and the carrier substantially opposite the row of first supporting elements, and means for adjusting the supporting elements of at least one of the aforementioned rows substantially radially of the shell. The shell has a cylindrical internal surface and each supporting element has a (normally convex) external surface which is adjacent the internal surface of the shell. The external surfaces of at least some second supporting elements are preferably smaller than the external surface of a first supporting element. Alternatively or in addition to such dimensioning of the external surfaces, the mutual spacing of neighboring first supporting elements in the respective row or rows can be greater than the mutual spacing of neighboring second supporting elements in the respective row or rows.

The system can comprise a third roll and the other of the at least two rolls is then disposed between the one roll and the third roll. In accordance with a presently preferred embodiment, the third roll comprises a second carrier, a second shell surrounding the second carrier and being movable radially with respect thereto, third and fourth annular supports interposed between the end portions of the second shell and the second carrier with freedom of movement relative to the second carrier substantially radially of the second shell between a plurality of different positions, and means for arresting the third and fourth supports in selected positions with reference to the second carrier.

Each arresting means can comprise at least one chamber whose volume varies as a function of movements of the respective supports between the plurality of positions, a source of pressurized fluid (preferably a hydraulic fluid), and means for regulating the flow of fluid between the source and the chamber. Each arresting means preferably comprises first and second chambers, and the volume of one of these chambers increases while the volume of the other chamber decreases and vice versa. The fluid flow regulating means of such arresting means includes first and second conduits for the first and second chambers, and the fluid flow regulating means of such arresting means also includes at least one shutoff valve in each conduit. The carrier can be formed with bores which extend substantially radially of the shell, and the arresting means for the supports of such a roll can further comprise pistons provided on the supports and extending into the bores of the carrier. Each chamber is defined by a piston and the adjacent portion of the carrier, i.e., each chamber forms part of the respective bore.

Each arresting means can further comprise means for refilling the chamber or chambers with pressurized fluid when the quantity of fluid in a chamber decreases while the respective shutoff valve seals the source from the corresponding chamber, e.g., in response to undetected, uncontrollable or unavoidable leakage of fluid from a chamber.

In accordance with a presently preferred embodiment of the arresting means, the latter comprises a source of reference signals (e.g., one or more potentiometers or processors) denoting the desired pressure of fluid in the chambers, means for monitoring the pressure in each chamber and for generating second signals which denote the monitored pressure, means for comparing the second signals with the respective reference signals and for generating third signals which denote the difference between the intensities and/or other characteristics of the reference signals and the respective second signals, and means for closing the valves in response to the respective third signals when the intensity of a second signal matches or exceeds the intensity of the respective reference signal, and for opening the valves when the intensity of second signals is less than the intensity of the respective reference signals. The intensities of the reference signals are preferably variable, and the closing and opening means can include means for opening each valve during varying of the intensities of the respective reference signals. Such fluid flow regulating means can further comprise pressure regulating means (particularly a relief valve) in each conduit. The pressure regulating means are arranged to permit the flow of fluid from the source (e.g., a pump which draws fluid from a tank for a supply of oil) toward the respective chambers, at least while the shutoff valves in the respective conduits are open, and to maintain the fluid which passes therethrough at a pressure which is denoted by the respective reference signals.

The just discussed fluid flow regulating means can further comprise means for delaying the opening and closing of the shutoff valves in response to the respective third signals. Still further, such fluid flow regulating means can comprise an accumulator of pressurized fluid for each conduit. The accumulators are connected with the respective conduits between the corresponding chambers and the corresponding monitoring means, and those sections of the conduits which connect the accumulators with the respective chambers offer less resistance to the flow of a fluid than the sections which extend between the accumulators and the respective monitoring means. The capacity of each accumulator can be less than 501 $cm^3$, preferably less than 201 $cm^3$.

Each arresting means can be provided with discrete first and second means for refilling the respective chambers in the event of leakage, and each refilling means is preferably adjustable independently of the other so that the pressure in one of the chambers can but need not match the pressure in the other chamber. Each refilling means can include the respective shutoff valve and the respective pressure generating means (e.g., a relief valve).

A discrete arresting unit can be provided for each support in each roll having a radially movable shell.

The novel features which are considered as characteristic of the invention are set forth in particular in the appended claims. The improved system of rolls itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 4 is a smaller-scale fragmentary axial sectional view of the modified roll;

FIG. 5 is a fragmentary axial sectional view of a third roll;

FIG. 6 is a schematic end elevational view of a system of two neighboring rolls at least one of which is constructed in a manner as shown in FIGS. 1-2, in FIGS. 3-4 or in FIG. 5;

FIG. 7 is a similar schematic end elevational view of a system of five superimposed rolls wherein at least the uppermost and the lowermost rolls are constructed in a manner as shown in FIGS. 1-2, in FIGS. 3-4 or in FIG. 5; and FIG. 8 is a fragmentary axial sectional view of a further roll which is provided with means for refilling the chambers of its arresting units.

DESCRIPTION OF THE PREFERRED EMBODIMENTS

Figure 1:
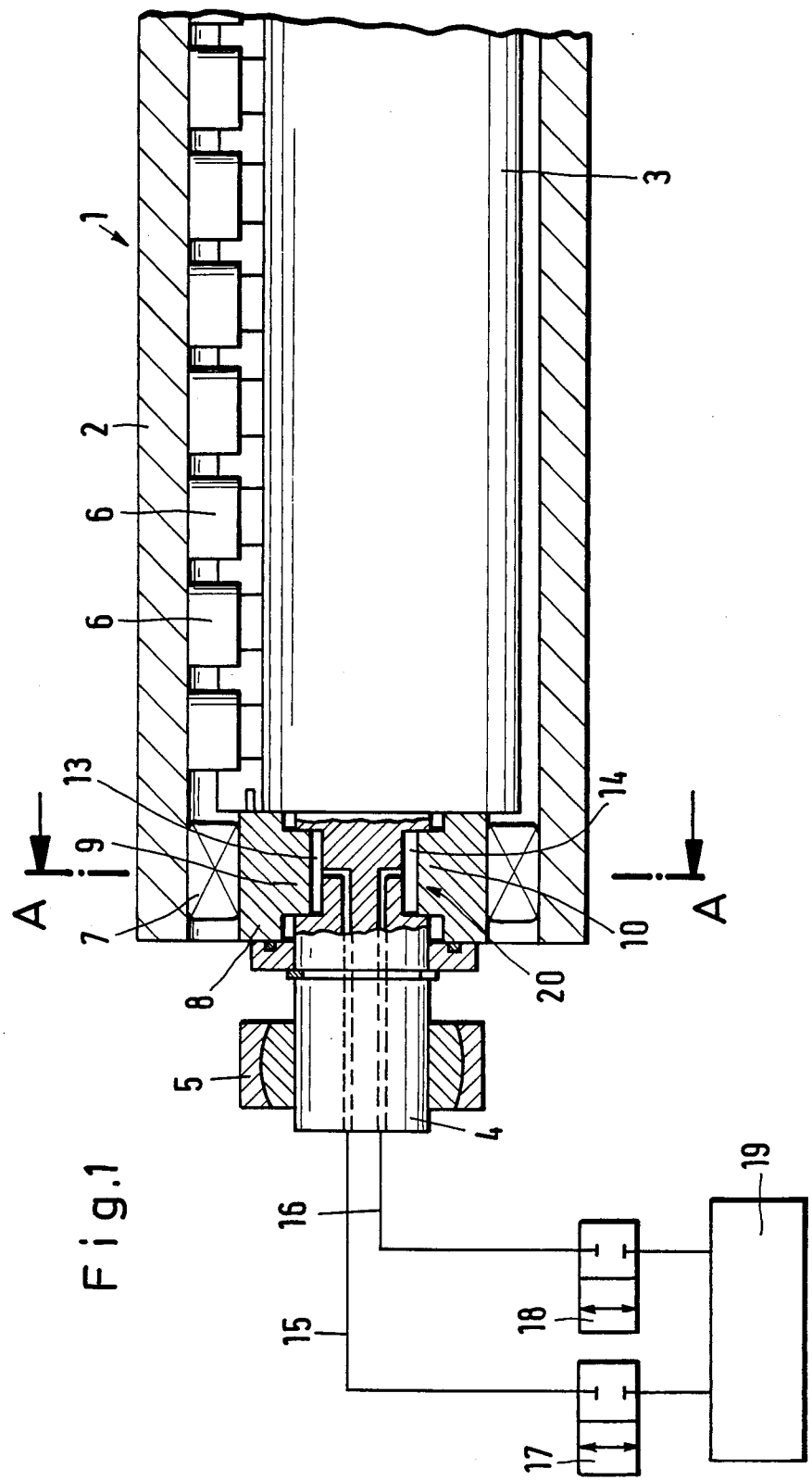
FIG. 1 is a fragmentary axial sectional view of one roll in a system of rolls for use in a calender or the like, further showing one of two arresting units for the annular supports which are interposed between the end portions of the deformable shell and the carrier.
Figure 2:
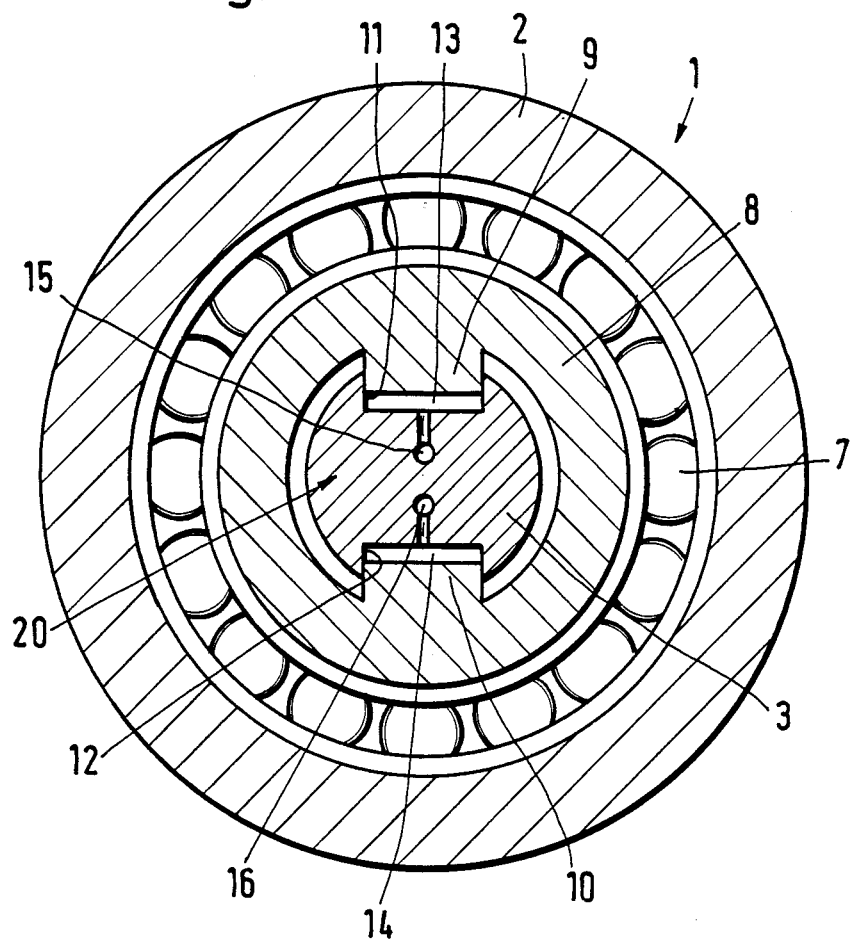
FIG. 2 is an enlarged transverse vertical sectional view as seen in the direction of arrows from the line A—A of FIG. 1 and shows additional details of the arresting unit.

FIGS. 1 and 2 show a portion of a roll 1 which can be used in a calender or in a like machine and includes an elongated horizontal carrier or beam 3 and a deformable hollow cylindrcal shell 2 which rotatably surrounds the carrier with freedom of radial movement relative thereto. The end portions 4 (one shown in FIG. 1) of the carrier 3 are non-rotatably mounted in spherical bearings 5 (one shown in FIG. 1) which are installed in the frame or housing (not shown) of the calender. Reference may be had to commonly owned U.S. Pat. Nos. 4,290,351 and 4,311,091 of the assignee.

The roll 1 further comprises at least one row of primary hydrostatic supporting elements 6 which are interposed between the carrier 3 and the cylindrical internal surface of the shell 2 and are movable substantially radially of the shell in a manner and for purposes as set forth, for example, in commonly owned U.S. Pat. Nos. 4,328,744, 4,394,793 and 4,457,057 of the assignee. Each of the supporting elements 6 is adjustable radially of the shell 2 so as to influence the level and/or the profile of the shell and to conform the profile to the desired width of the nip which the roll 1 defines with a neighboring roll. Reference may be had, for example, to FIG. 6 which shows a lower roll 48 corresponding to the roll 1 of FIGS. 1-2 except that its shell has an external lining or layer 301 of elastic material (such as paper or a synthetic plastic substance), and an upper roll 46 whose lowermost portion defines with the elastic lining or layer 301 an elongated nip extending at right angles to the plane of FIG. 6 and serving for the passage of a running web (not shown) of paper, metallic or plastic foil, textile or other sheet material. The row or rows of primary hydrostatic supporting elements 6 which are shown in FIG. 1 are adjacent the nip which the shell 2 defines with an adjacent roll.

The means for adjusting the supporting elements 6 can comprise a single source of pressurized hydraulic fluid and a control unit which regulates the flow of pressurized fluid to and from pressure generating devices (particularly cylinder and piston units) which operate between the carrier 3 and the respective supporting elements 6. The arrangement is or can be such that the supporting elements 6 are assembled into groups which are adjustable simultaneously in response to actuation of the respective part of the control unit. For example, the two leftmost supporting elements 6 of FIG. 1 can form a first group, the two neighboring supporting elements 6 can form a second group, and so forth. All this is fully described and shown in numerous United States and foreign patents of the assignee.

The end portions of the shell 2 surround antifriction bearings 7 (one shown in each of FIGS. 1 and 2) which, in turn, surround annular supports (hereinafter called rings) 8 which are movable with the end portions of the shell 2 relative to the carrier 3 and substantially radially of the shell but cannot rotate about the carrier. The rings 8, the respective bearings 7 and the corresponding end portions of the shell 2 are movable radially of the adjacent roll (such as the roll 46 of FIG. 6) and, in accordance with a feature of the invention, each of the rings 8 can be arrested in any one of a practically infinite number of different positions relative to the carrier 3 by an arresting unit 20 to thereby maintain the end portions of the shell 2 at a selected level.

As shown in FIG. 2, each arresting unit 20 comprises two pistons 9, 10 which are integral with or rigidly connected to the respective ring 8 and extend into complementary cylindrical bores 11, 12 which are machined into or otherwise formed in the respective end portion 4 of the carrier 3. The bores 11, 12 are coaxial with one another and with the pistons 9, 10 and their common axis extends diametrically of the shell 2. The piston 9 and the carrier 3 define a first cylinder chamber 13, and a similar cylinder chamber 14 is defined by the piston 10 with the adjacent portion of the carrier 3. The volume or capacity of the chamber 13 increases or decreases in response to movements of the respective ring 8 relative to the carrier 3, and the same holds true for the volume or capacity of the chamber 14. The capacity of the chamber 13 increases with each reduction of the capacity of the chamber 14 and vice versa. Suitable ring-shaped seals are recessed into the peripheral surfaces of the pistons 9, 10 and/or into the surfaces which surround the bores 11, 12 in order to prevent or to minimize the escape of fluid from the respective chambers 13 and 14.

Each arresting unit 20 further comprises a source 19 of pressurized hydraulic fluid (e.g., oil) and means for connecting the source 19 with the chambers 13 and 14. If desired, a single source 19 (e.g., a pump which draws oil from a tank) can supply pressurized hydraulic fluid to the chambers 13, 14 of both arresting units 20. The connecting means comprises a first conduit 15 which connects the chamber 13 with the source 19 and contains a first regulating device in the form of a shutoff valve 17, and a second conduit 16 which connects the source 19 with the chamber 14 and contains a second regulating device in the form of a shutoff valve 18. The conduits 15, 16 include channels which are formed in the carrier 3.

When the valves 17, 18 are open so that the source 19 can supply fluid to that chamber (13 or 14) whose volume is on the increase while the other chamber is free to discharge fluid, the positions of the rings 8 relative to the carrier 3 can be altered solely by the hydrostatic supporting elements 6, i.e., these supporting elements can lift the shell 2 relative to the carrier or they can permit the shell to descend by gravity and/or under the weight of the roll above it. Once the rings 8 at both axial ends of the shell 2 reach their selected positions, the shutoff valves 17, 18 are closed so that the chambers 13, 14 at both ends of the shell remain filled with hydraulic fluid whereby the entrapped fluid acts not unlike a solid body which reliably holds the end portions of the shell in selected positions with reference to the respective end portions 4 of the carrier 3. The pressure of fluid which is supplied by the source 19 can be relatively low if the rings 8 are to move relative to the carrier 3 exclusively by gravity or in response to lifting of the supporting elements 6, i.e., all that is necessary is to ensure that the chambers 13 and 14 are invariably filled with hydraulic fluid.

However, it is equally within the purview of the invention to employ one or more sources wherein the pressure of hydraulic fluid is sufficiently high to effect a lifting or lowering of the respective rings 8 in response to appropriate manipulation of shutoff valves 17, 18 or other suitable fluid flow regulating means. For example, the valve 17 will be operated to connect the source 19 with the upper chamber 13 of FIG. 1 by way of the conduit 15 while the valve 18 is actuated to connect the lower chamber 14 with the sump by way of the conduit 16 at a rate such that the chamber 14 remains filled with hydraulic fluid while the ring 8 descends in response to admission of fluid into the chamber 13. Such arrangement can be employed to raise or lower the shell 2 against the opposition of large forces, e.g., against the weight of the shell, against the resistance of pressure generating devices for the supporting elements 6 and against the weight of a roll on top of the shell 2.

Once the end portions of the shell 2 have reached the desired (selected) positions, the valves 17, 18 are closed so that the fluid remains entrapped in the respective chambers 13, 14 and the positions of the end portions of the shell then remain unchanged. The manner of dealing with losses due to leakage of fluid from the chamber 13 and/or 14 will be discussed in detail with reference to the roll which is shown in FIG. 8.

As mentioned above, the pistons 9 and 10 can but need not be integral with the respective rings 8. It is presently preferred to make the pistons 9 and 10 separately, to insert them into the respective bores 11, 12 of the carrier 3, to thereupon slip the rings 8 onto the respective pairs of pistons, and to secure the pistons to the respective rings by means of screws or other suitable fasteners, not shown, which extend substantially axially of the respective pistons. The rings 8 can be formed with internal flats (e.g., at the bottoms of axially parallel grooves, not shown) which abut the outer end faces of the respective pistons 9 and 10. Each piston can be provided with a pair of flats which engage with lateral surfaces in the respective axially parallel grooves of the corresponding ring 8 to thus ensure that the pistons cannot rotate about their own axes, either prior or subsequent to application of the fasteners. Other types of tongue and groove connections, dovetailed connections or the like can be employed to ensure that the rings 8 and the respective pairs of pistons 9, 10 cannot perform any movements relative to each other.

Figure 3:
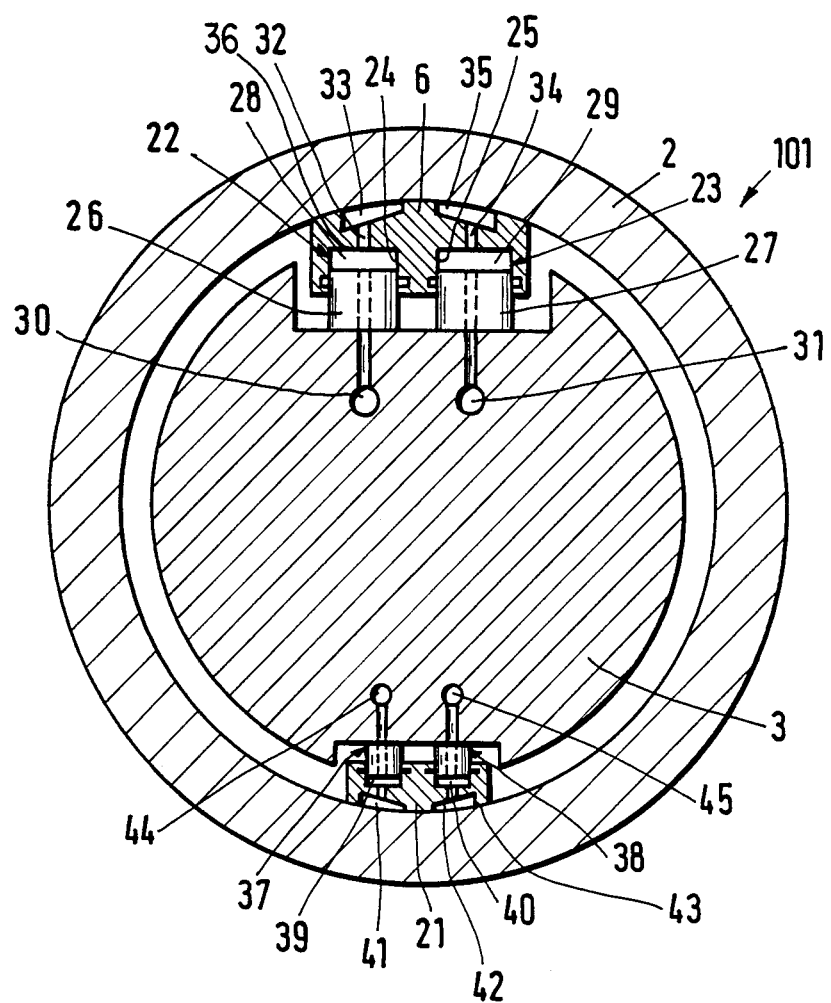
FIG. 3 is a transverse vertical sectional view of a modified roll, substantially as seen in the direction of arrows from the line B—B of FIG. 4.

FIGS. 3 and 4 show a portion of a modified roll 101. All such parts which are identical with or clearly analogous to the corresponding parts of the roll 1 are denoted by similar reference characters. The construction of arresting units for the rings 8 (one shown in FIG. 4) within the antifriction bearings in the end portions of the shell 2 is or can be the same as that of the arresting unit 20 which is shown in FIGS. 1-2.

Actually, the only important difference between the rolls 1 and 101 is that the latter roll comprises at least one row of secondary hydrostatic supporting elements 21 which are disposed substantially diametrically opposite the row of primary supporting elements 6 and can be acted upon by pressure generating devices in order to oppose an upward movement of the shell 2 under the action of the supporting elements 6 and/or to positively urge the shell 2 downwardly, i.e., to increase the volumes of the chambers for the pistons 9 while reducing the volumes of the chambers for the pistons 10.

The secondary supporting elements 21 cooperate with the primary supporting elements 6 to stabilize the shell 2, particularly to prevent lateral stray movements of the shell in a direction to the left or to the right as seen in FIG. 3.

The means for adjusting the primary supporting element 6 which is shown in FIG. 3 comprises two pressure generating devices 22, 23 which are adjacent one another in the circumferential direction of the shell 2 and each of which constitutes a hydraulic cylinder and piston unit. The pistons 26, 27 of the pressure generating devices 22, 23 are rigid with the carrier 3 and respectively extend into cylindrical bores 24, 25 of the supporting element 6. The cylinder chambers 28, 29 which the supporting element 6 defines with the respective pistons 26, 27 constitute portions of the respective bores 24, 25 and communicate with recesses or pockets 33, 35 in the external surface 36 of the element 6. The chambers 33, 34 respectively receive pressurized hydraulic fluid by way of conduits 30, 31 which include axially parallel channels machined into the carrier 3, radially extending channels machined into the carrier 3, and axially extending channels machined into the pistons 26, 27. The means for admitting pressurized fluid from the chambers 28, 29 into the respective pockets 33, 35 comprises throttling passages 32, 34 in the supporting element 6. The means for regulating the flow of pressurized fluid between a source (not shown) and the chambers 28, 29 includes valves (not shown) and means for controlling the operation of valves in a manner as disclosed in several aforementioned United States patents of the assignee. The shell 2 is hydrostatically supported by the primary supporting elements 6 in the regions of the respective exposed surfaces 36 with a minimum of friction. The fluid medium which escapes from the pockets 33, 35 is collected in the interior of the shell 2 and is returned to the sump, not shown. Such fluid medium forms a thin layer between the non-recessed portions of the external surface 36 and the internal surface of the shell 2.

The construction and mounting of the secondary hydrostatic supporting element 21 which is shown in FIG. 3 are analogous to those of the supporting element 6 thereabove. The element 21 has an external surface 43 which is formed with pockets 41, 42 and with flow restricting or throttling passages which connect the pockets with two cylinder chambers 39, 40 receiving pistons which form part of two pressure generating devices 37, 38. The chambers 39, 40 can receive pressurized fluid or can discharge fluid by way of conduits 44, 45 which are machined in part into the carrier 3 and in part into the pistons of the pressure generating devices 37, 38. The manner in which the flow of fluid in the conduits 44, 45 is controlled by valves or the like is not shown in FIGS. 3 and 4. Reference may be had to the aforementioned patents of the assignee which disclose all necessary details of the means for adjusting one or more rows of secondary supporting elements with reference to the carrier. The pressure generating devices (adjusting means) 37, 38 for the secondary supporting element 21 of FIG. 3 are disposed side by side as seen in the circumferential direction of the shell 2.

The external surface 43 of the secondary supporting element 21 of FIG. 3 is much smaller than the external surface 36 of the primary supporting element 6. This can apply for some or all of the secondary supporting elements 21. Moreover, the cross-sectional areas of pistons in the pressure generating devices 37, 38 are much smaller than the cross-sectional area of the piston 26 or 27. For example, the area of each exposed surface 43, or of some of these exposed surfaces, can equal or approximate half the area of an exposed surface 36. Furthermore, the cross-sectional area of the piston of the pressure generating device 37 or 38 can equal or approximate half the cross-sectional area of a piston 26 or 27. Such design of the supporting elements necessitates the application of higher pressures by the pressure generating devices 37, 38 for the secondary supporting elements; however, friction between the secondary supporting elements and the shell 2 is much less pronounced and this results in a reduction of heating action upon the shell 2 and upon other parts of the roll 101. The lands surrounding the pockets 41, 42 of the supporting element 21 which is shown in FIG. 3 are much narrower than the lands surrounding the pockets 33, 35 in the exposed surface 36 of the supporting element 6, i.e., the combined area of films of a fluid medium between the exposed surface 36 and the internal surface 2 is much larger than the combined area of fluid films between the shell and the external surface 43. The just described design of the supporting elements renders it possible to save energy for operation of the drive means (not shown) which rotates the shell 2 relative to the carrier 3.

The aforedescribed relationships between the areas of the exposed surfaces 36 and 43 refer to the entire exposed surfaces, i.e., to those portions of the exposed surfaces which are immediately adjacent the internal surface of the shell 2 as well as to the surfaces at the bottoms of the respective pockets 33, 35 and 41, 42. The difference which counts, as far as the reduction of friction is concerned, is that between the combined area of lands on an exposed surface 36 as compared with the combined area of lands on the exposed surface 43. In other words, the combined area of lands around the pockets (41, 42) of a relatively small external surface (43) is less, or much less, than the combined area of lands around the pockets (33, 35) in a relatively large external surface (36).

FIG. 5 shows a portion of a roll 201 wherein the number of secondary supporting elements 221 is less than (e.g., half) the number of primary supporting elements 6. Each second primary supporting element 6 is disposed opposite a secondary supporting element 221. In all other respects, the supporting elements 6 and 221 can be constructed and adjusted in a manner as shown and described in connection with the supporting elements 6 and 21 of FIGS. 3 and 4. Each of the arresting units for the rings in the end portions of the shell 2 which is shown in FIG. 5 can be constructed and operated in a manner as described for the arresting unit 20 of FIGS. 1–2.

An advantage of arresting units 20 for the rings 8 is that, when the roll 1 cooperates with a standard roll or with a roll having a rotary shell with a peripheral surface which cannot move toward or away from the nip between the two rolls, the magnitude and distribution of loads upon a running web in the nip can be influenced in a very simple and efficient way by properly selecting the positions of the rings 8 with reference to the carrier 3 and by thereupon arresting the rings in such selected positions. In addition, by properly selecting the positions of the rings 8 and by thereupon fixing or arresting the rings in their selected positions, the operator or an automatic regulating circuit can control the width of the nip in conjunction with the means for adjusting the primary and/or secondary hydrostatic supporting elements in the interior of the shell 2. The forces which are generated by the arresting units 20 act upon the shell 2 with relatively large axial lever arms which contributes to a highly satisfactory deformability of the shell and to attendant ability to select a proper configuration for the nip and a proper distribution of loads along the nip. At any rate, the forces which must be transmitted by the supporting elements are much smaller than if the rings 8 and the respective end portions of the shell 2 were free to move relative to the carrier in the radial direction of the shell 2, i.e., toward or away from the nip. Consequently (i.e., because the forces which are transmitted to the internal surface of the shell 2 by the supporting elements 6 and/or 21 or 221 are relatively small), friction between the supporting elements and the shell is also small and this entails the generation of less heat. Moreover, and since the magnitude of friction between the shell and the supporting elements directly influences the energy requirements of the means for rotating the shell around the carrier 3, the energy requirements of the rotating means are reduced accordingly. As mentioned above, it is rather simple to determine, either with a certain amount of experimentation or with a computer, those positions of the rings 8 in which the sum of forces which are transmitted by the supporting elements is reduced to a minimum value.

Pronounced reduction of friction between the supporting elements and the shell 2 renders it possible to lower the temperature of the entire shell or to lower the temperature of selected portions of the shell. This renders it possible to provide the exterior of the shell 2 with an elastic layer of paper or plastic material. Such layer (note the layer 301 in FIG. 6) constitutes a heat insulator and is useful and intact only if the temperature of the shell is not raised above a relatively low maximum permissible value. Furthermore, the feature that the temperature of the shell can be maintained at a relatively low value reduces the likelihood of the development of temperature-dependent camber which, if present, must be taken into consideration by the control means which varies the profile of the shell. The camber contributes to complexity of such control means.

Another important advantage of a roll which is equipped with arresting units 20 is that the number of primary and/or secondary supporting elements in the shell 2 can be reduced as well as that it is possible to reduce the numbers of groups of supporting elements which are to be adjusted independently of each other. For example, if a conventional roll employs eight groups of two primary supporting elements each, the roll 1 can operate just as satisfactorily with five or six groups which contributes to a significant reduction of complexity of the means for adjusting the supporting elements (i.e., of the means for varying the profile of the shell 2). Such reduction of the number of groups of jointly adjustable supporting elements does not lead to the development of undesirable M- or W-profiles of shells.

While it is possible to employ arresting units each of which has a single chamber (13 or 14), it is preferred to provide each arresting unit with two chambers because this enables the arresting units to take up positive as well as negative stresses which act in the plane including the axes of two neighboring rolls and the nip of such rolls. This is desirable and advantageous if the load upon the running web in the nip (in selected positions of the corresponding rings 8) must fluctuate all the way between a maximum and a minimum permissible value.

The bores 11 and 12 may but need not always have a cylindrical outline. Cylindrical bores are preferred because they can be readily machined with a high degree of accuracy to reduce the likelihood of leakage and also because a cylindrical piston can be more readily equipped with satisfactory sealing rings than a piston having a non-cylindrical cross-sectional outline. While it is possible to reverse the positions of the pistons 9, 10 and of the respective bores 11, 12, the provision of bores in the carrier 3 is preferred at this time because it is simpler to attach separately produced pistons to the respective rings 8 (after the rings have been properly located on the end portions 4 of the carrier 3) than to attach separately produced pistons to the carrier. The rings 8 are automatically held against rotation relative to the end portions 4 of the carrier 3 as soon as their pistons 9, 10 have entered the respective bores 11 and 12.

The utilization of secondary supporting elements 21 or 221 whose exposed surfaces 43 are smaller than the exposed surfaces 36 of the primary supporting elements 6 contributes to a further reduction of friction (i.e., in addition to that reduction which is attributable to the provision of arresting units 20) and to a further lowering of the temperature of the shell 2 as well as to a further reduction of energy requirements of the means for rotating the shell. The fact that it is then advisable or necessary to raise the pressure of fluid in the adjusting means 37, 38 for the secondary supporting elements 21 or 221 is of no consequence because the forces which must be taken up by the secondary supporting elements are normally smaller than those which must be counteracted by the primary supporting elements 6.

The feature which is shown in FIG. 5 contributes still further to a reduction of friction between the shell 2 and the secondary supporting elements 221 and brings about a further reduction of the temperature of the shell 2 and a further reduction of energy requirements of the means for rotating the shell.

Referring again to FIG. 6, the upper roll 46 of the system of rolls which is shown therein is mounted on two fixed bearings 47, one at each axial end of the roll. As mentioned above, the lower roll 48 of FIG. 6 has a shell with an elastic outer layer or lining 301 of paper or a suitable plastic material, and the end portions of the carrier 3 are non-rotatably mounted in the frame of a calender or a like machine. If the upper roll 46 also comprises a deformable shell 2 and a fixed carrier 3, the fixed bearings 47 can be constituted by two arresting units of the type shown in FIGS. 1 and 2, i.e., the end portions of the shell of the roll 46 can be arrested in any desired (selected) position at a given distance from the axis of the shell of the lower roll 48 by appropriate selection of the volumes of upper and lower chambers (corresponding to chambers 13, 14 of FIG. 2) in the two arresting units. If the upper chambers (13) are filled with a substantially non-compressible hydraulic fluid, the shell of the upper roll 46 is held in its lowermost position. By filling the lower chambers (14), one can move the shell of the roll 46 to its upper end position, e.g., in order to widen the nip of the roll 46 and the layer 301 of the roll 48.

FIG. 7 shows a modified system of rolls including a pair of outer rolls 401, 401' and a set of three additional or intermediate rolls 49, 50, 51. Each of the intermediate rolls 49–51 can constitute a standard calender roll, e.g., a roll without a shell which is rotatable and movable radially with reference to a non-rotatable carrier. The system of rolls 401, 51, 50, 49 and 401' can be used in a supercalender. The construction of the two outer rolls 401, 401' preferably matches or resembles that of the roll 1 of FIGS. 1–2, of the roll 101 of FIGS. 3–4 or of the roll 201 of FIG. 5. At least one of the intermediate rolls 49–51 (e.g., the rolls 49, 51) can be provided with an elastic outer layer such as the layer 301 of the roll 48 shown in FIG. 6. The dimensions and construction of the roll 401 may but need not necessarily match the dimensions and construction of the roll 401'. Identity of such rolls is often desirable and advantageous because this renders it possible to maintain in storage a single spare roll which is to be used as a replacement for the roll 401 or 401'. The end portions of shells which form part of the rolls 401, 401' can be arrested in any one of a plurality of different positions (at different distances from the axes of the neighboring intermediate rolls 51, 49) in a manner as described with reference to FIGS. 1 and 2.

FIGS. 6 and 7 show the carriers 3 and bearings 47 in fixed positions corresponding to those which such parts assume when the machine (e.g., a supercalender) embodying the respective system of rolls is in actual use. However, it will be appreciated that such bearings and carriers can be moved up and down in a manner which is customary in many calenders or like machines, e.g., in a manner as described in the aforementioned commonly owned U.S. Pat. Nos. 4,290,351 and 4,311,091. For example, certain rolls of the system which is shown in FIG. 7 will be rapidly lowered if it is desired to remove an intermediate roll or to replace an intermediate roll with a roll having a larger or a smaller diameter. The primary supporting elements 6 in the rolls 401, 401' are installed in such a way that they are respectively adjacent the nips of the rolls 401, 51 and 401', 49, i.e., it is not always necessary that the primary supporting elements be disposed at a level above the respective secondary supporting elements.

The system which is shown in FIG. 7 exhibits the advantage that it is possible to further reduce friction between the shells of the outer rolls 401, 401' and the respective supporting elements. This is due to the fact that the rings in the end portions of the shells which constitute component parts of these outer rolls can be moved to and held in selected positions which, in turn, renders it possible to properly relate the adjustment of the profile of one of the shells to the adjustment of the profile of the other shell. As mentioned above, it is even possible to employ identical outer rolls so that the number of rolls which must be kept in storage to replace a defective roll 401 or 401' can be reduced accordingly.

In order to properly treat a running web passing through the nip of the rolls 46, 48 which are shown in FIG. 6 or through the nips of the rolls 401'-49, 49-50, 50-51 and 51-401 shown in FIG. 7, it is necessary to properly select the width of the nip or nips as well as the magnitude of forces which the rolls defining a nip or nips apply to the running web. The distribution of loads upon the rnning web can be constant all along a nip or it can vary from section to section of the nip. This can be readily accomplished by properly selecting the positions of rings (8) at the axial ends of the roll or rolls having deformable radially movable rotary shells as well as by properly selecting the pressure in the pressure generating devices for the primary supporting elements and/or for the secondary supporting elements within the confines of a shell. Each of the rings 8 can be moved to a position in which the sum of all forces which are applied by primary and secondary supporting elements is reduced to a minimum value. Such positions of the rings 8 can be ascertained with a reasonable amount of experimentation. A modern calender or a like machine is normally equipped with a computer which furnishes information pertaining to the required settings for the rings 8.

FIG. 8 shows a portion of a further roll 1 which, save for the arresting means and certain additional features, can be identical with the similarly referenced roll 1 of FIGS. 1 and 2. The chambers 13, 14 of the arresting unit 20 for the left-hand ring 8 of FIG. 8 (the other ring is not shown) are respectively connected with accumulators 61 and 62 for relatively small quantities of a pressurized hydraulic fluid. The main source of pressurized fluid (e.g., a pump which draws fluid from a tank) is shown at 119. The conduit 15 further contains in series two valves including a pressure regulating valve 52 and a shutoff valve 117. Analogously, the conduit 16 contains a pressure regulating valve 53 and a shutoff valve 118. A common filter 54 for hydraulic fluid is interposed between the source 119 and the valves 52, 53. The arresting unit 20 can maintain the respective ring 8 (and hence the respective end portion of the shell 2) in a desired position with reference to the carrier 3, e.g., in one of two end positions or in any one of a large or infinite number of intermediate positions. When the chambers 13, 14 are filled with hydraulic fluid and the shutoff valves 117, 118 are closed, the fluid which is entrapped in the chambers 13, 14 acts not unlike a solid body or block and reliably holds the respective end portion of the shell 2 at a desired level, i.e., in a selected position with reference to the corresponding end portion 4 of the carrier 3.

The means for controlling the operation of the valves 117 and 118 comprises two electric circuits 55, 56 which respectively include comparators 57 and 58. The comparator 57 receives electric signals $I_1$ from the output of a pressure gauge 59 which monitors the pressure p of fluid in the conduit 15 upstream of the accumulator 61 (as considered in the direction of fluid flow into the chamber 13), and the comparator 58 receives electric signals $I_2$ from a pressure gauge 60 which monitors the pressure p of fluid in the conduit 16 upstream of the accumulator 62. The circuits 55 and 56 respectively include inputs for threshold or reference signals $G_1$ and $G_2$ which respectively denote the threshold values of pressure p in the conduits 15 and 16. The threshold signals $G_1$ and $G_2$ can be selected by hand (e.g., in response to adjustments of two potentiometers) or they can be furnished by a processor or computer, not shown. If the actual value (signal $I_1$ or $I_2$) of the pressure in the conduit 15 or 16 reaches the respective threshold value (signal $G_1$ or $G_2$), or if the value of I exceeds the value of the respective threshold signal G, the respective circuit 55 or 56 transmits a signal $E_1$ or $E_2$ which energizes the solenoid of the corresponding shutoff valve 117 or 118 so that the shutoff valve assumes its closed position and blocks the flow of fluid between the source 119 and the chamber 13 or 14. The shutoff valve 117 or 118 opens when the value of $I_1$ or $I_2$ drops below the respective reference or threshold value, again in response to an appropriate signal (e.g., the absence of a signal) from the respective circuit 55 or 56. The valves 117, 118 can constitute commercially available seat valves wherein a reciprocable or otherwise displaceable valving element is movable toward and away from sealing engagement with a seat.

The pressure regulating valves 52 and 53 are adjusted so as to respond to selected pressures of fluid in the respective conduits 15 and 16. As shown, the valve 52 responds to the threshold signal $G_1$ and the valve 53 responds to the threshold signal $G_2$. Each of the valves 52, 53 preferably constitutes a commercially available electromagnetic valve with an electromagnetic pilot system and a path for return flow of fluid. The valves 52 and 53 are set so as to maintain the pressure at their outlets at a preselected value ($G_1$ and $G_2$). It is possible to provide a common threshold value signal for the circuit 55 and valve 52, and a common threshold value signal for the circuit 56 and valve 53. The current for excitation of solenoids in the valves 52 and 53 can be furnished by the respective circuits 55 and 56.

The accumulators 61 and 62 are relatively small, e.g., each of these accumulators can store up to 500 cm$^3$, preferably about 200 cm$^2$ of pressurized fluid or even less. That portion or section of the cnduit 15 which extends between the chamber 13 and the accumulator 61 offers a relatively low resistance to the flow of hydraulic fluid, and the next section of the conduit 15 (between the accumulator 61 and the pressure gauge 59) offers a higher resistance to the flow of fluid. The same applies for the conduit 16, i.e., its resistance to the flow of fluid between the chamber 14 and the accumulator 62 is lower than between the accumulator 62 and the pressure gauge 60. This is desirable and advantageous because the accumulators 61 and 62 can compensate for fluctuations of fluid pressure in the respective portions or sections of the conduits 15 and 16. In fact, the accumulators 61 and 62 can eliminate or compensate for fluctuations of fluid pressure to such an extent that the fluctuations are not felt by, and do not influence, the pressure gauges 59 and 60.

The utilization of accumulators in a roll for use in calenders or the like in order to supply a pressurized fluid to the chambers of pressure generating devices for hydrostatic supporting elements is disclosed in commonly owned U.S. Pat. No. 4,514,887.

The valves 117 and 52 can be said to jointly constitute a first refilling device 63 which compensates for the leakage of fluid from the chamber 13 and from the conduit 15, and the valves 118, 53 can be said to jointly constitute a second refilling device 64 which compensates for the leakage of fluid from the chamber 14 and from the conduit 16 when the machine embodying the roll 1 of FIG. 8 is in actual use. If desired, the valves 52 and 117 can constitute a first prefabricated aggregate and the valves 53, 118 can constitute a second prefabricated aggregate. This simplifies the initial and assembly cost of the fluid flow regulating means of FIG. 8.

The circuits 55 and 56 further respectively comprise delay means 65 and 66 for the signals $E_1$ and $E_2$. The delay means serve to delay signals which are transmitted to open and/or close the respective shutoff valves 117, 118. Still further, the circuits 55 and 56 comprise devices 67, 68 which automatically open the respective valves 117, 118 (by cutting off the respective signals $E_1$ and $E_2$) during a change of threshold value signals $G_1$ and $G_2$. In this manner, it is possible to reduce the volumes of the respective chambers.

When the machine is to be started, the chambers 13 and 14 are filled with preselected quantities of fluid so that the ring 8 of FIG. 8 is moved to a preselected level e.g., to a preselected intermediate position. In the next step, the shutoff valves 117 and 118 are closed. When the machine is in use, the fluid in each of the chambers 13, 14 is maintained at a preselected operating pressure. Signals ($G_1$ and $G_2$) denoting such operating pressures in the chambers 13 and 14 are applied to the inputs of the respective circuits 55 and 56 as well as to the pressure regulating valves 52 and 53. If the ring 8 is subjected to the action of external forces which tend to shift it with reference to the end portion 4 of the carrier 3, the fluid which is entrapped in the chambers 13 and 14 opposes such movements of the ring 8, i.e., the ring and the corresponding end portion of the shell 2 remain in preselected positions.

If the fluid can leak from the chamber 13 and/or 14, the pressure in the respective chamber(s) sinks and the corresponding shutoff valve 117 or 118 opens because the actual pressure (signal $I_1$ or $I_2$) of fluid (as determined by the respective gauge 59, 60) drops below the threshold value denoted by the signal $G_1$ or $G_2$. The pressure regulating valve 52 or 53 also opens and admits into the respective chamber (13 or 14) additional fluid to compensate for leakage and to reestablish the selected pressure (signal $G_1$ or $G_2$). As mentioned above, the pressure at the outlet of each of the valves 52, 53 matches the pressure which is denoted by the respective threshold signal $G_1$ or $G_2$. The valve 52 or 53 closes automatically when the pressure of fluid in the respective chamber 13 or 14 reassumes the desired value (i.e., when the intensity of the signal $I_1$ or $I_2$ again matches or exceeds the intensity of the respective threshold or reference signal $G_1$ or $G_2$).

The initial operating pressures in the chambers 13 and 14 are ascertained by the gauges 59 and 60 which then transmit threshold signals $G_1$ and $G_2$ to the respective circuits 55, 56 as well as to the respective valves 52, 53. Alternatively, the initial operating pressures in the chambers 13, 14 can be calculated or ascertained by separate pressure monitoring means which generate and transmit the respective threshold or reference signals $G_1$ and $G_2$.

The chambers 13 and 14 are filled with hydraulic fluid prior to adjustment of the primary supporting elements 6, i.e., before such supporting elements are biased against the internal surface of the shell 2. As mentioned above, the pressures which are then necessary to change the positions of the rings 8 relative to the carrier 3 are relatively low. However, it is also within the purview of the invention to fill the chambers 13 and 14 with a highly pressurized fluid after an adjustment of the supporting elements 6 or simultaneously with such adjustment. The pressure regulating valves 52 and 53 are then set to maintain the fluid at their outlets at a higher (and, if necessary, at a much higher) pressure. The pressures which are denoted by the signals $G_1$ and $G_2$ then correspond exactly to the filling pressures.

The roll which is shown in FIG. 8 exhibits a number of important advantages. Thus, the refilling means 63, 64 do not interfere with the operation of the arresting units 20 because they remain inactive if the pressure in the chamber 13 or 14 rises above the pressure which is denoted by the signal $G_1$ or $G_2$, for example, as a result of the application of a greater load upon the running web. In other words, the shutoff valve 117 or 118 remains closed if the pressure in the respective chamber 13 or 14 rises above that which is denoted by the signal $G_1$ or $G_2$.

Automatic opening of shutoff valves 117, 118 during a change of the intensity of signals $G_1$, $G_2$ is particularly desirable and advantageous when it is necessary to reduce the pressure in the chambers 13, 14, i.e., when the intensity of the signal $G_1$ or $G_2$ is being reduced.

The feature that the pressures to which the valves 52, 53 respond match the values denoted by the signals $G_1$ and $G_2$ is desirable because this ensures that the refilling operation is simplified since the pressure in the chamber 13 or 14 is automatically restored to the value represented by the signal $G_1$ or $G_2$ as soon as the respective shutoff valve 117 or 118 is opened. In other words, the restored volumes of the chambers 13, 14 are such that the respective ring 8 automatically reassumes its selected position with reference to the carrier 3.

The preferably adjustable delay units 65 and 66 ensure that the respective shutoff valves 117 and 118 open and close with a preselected delay. This guarantees that the refilling operation is invariably completed before the shutoff valve 117 or 118 closes again. The arrangement may be such that the shutoff valve 117 or 118 responds with a delay which suffices to ascertain whether a drop of pressure in the chamber 13 or 14 is indeed attributable to leakage of some fluid rather than to other influences such as the inertia of the roll, fluctuations of load upon the roll and/or other factors which should not bring about an opening of the valve 117 or 118. Moreover, the provision of delay means 65 and 66 for transmission of signals to the solenoids (moving means) of the valves 117, 118 ensures the development of a certain switching hysteresis, i.e., the refilling means 63 and 64 are not actuated at an undesirably high frequency. The same or a similar result can be achieved if the arrangement of FIG. 8 is modified by ensuring that the shutoff valve 117 or 118 does not open in immediate response to a reduction of the intensity of signal $I_1$ or $I_2$ to a level below the intensity of the respective signal $G_1$ or $G_2$ but rather only when the difference between the intensities of signals $I_1$, $G_1$ or $I_2$, $G_2$ reaches a preselected value.

As explained above, the accumulators 61 and 62 ensure that those fluctuations of fluid pressure in the conduits 15, 16 and in the respective chambers 13, 14 which are attributable to external influences rather than to leakage of fluid from the chamber 13 or 14 cannot entail an immediate opening of the valve 117 or 118. On the other hand, the stabilizing influence of the accumulators 61, 62 should not be excessive so that it would prevent the refilling means 63, 64 from performing their intended functions, i.e., of ensuring that the chambers 13, 14 receive additional fluid when the pressure p in the conduit 15, 16 in the region of the respective monitoring means 59 or 60 drops as a result of leakage of fluid. This is the reason that the accumulators are relatively small, i.e., their volumes should not or need not exceed 500 cm³ and are preferably not more (and often considerably less) than 200 cm³.

The feature that the pressure at which the valve 52 opens can be selected independently of the pressure which brings about an opening of the valve 53 (and vice versa) is desirable on the ground that it is possible to select the pressure in the chamber 13 independently of the pressure in the chamber 14. In other words, the refilling means 63 and 64 can operate independently of each other to maintain the pressures of fluid in the respective chambers 13, 14 at desired values.

The improved system of rolls and its rolls can be modified in a number of additional ways. For example, it is possible to employ mechanical arresting units 20 in lieu of, or in addition to, the illustrated hydraulic arresting units. Hydraulically operated arresting units are preferred in many instances because they can be operated in a simple manner and, if desired, fully automatically to rapidly locate the rings 8 in desired positions with reference to the corresponding end portions 4 of the carrier 3. The chambers 13, 14 can be replaced with bellows, corrugated pipes or the like.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A system of rolls, particularly for use in calenders, comprising at least two neighboring rolls defining an elongated nip, at least one of said rolls including an elongated carrier; a deformable hollow cylindrical shell rotatably surrounding and movable radially with reference to said carrier, said shell having first and second end portions; first and second annular supports interposed between said carrier and the respective end portions of said shell with freedom of movement jointly with such portions relative to said carrier and radially of said shell between a plurality of different positions; means for moving said shell radially with reference to said carrier; and means for arresting said supports in selected positions with reference to said carrier, said arresting means comprising at least one chamber whose volume varies as a function of movements of said supports between said plurality of positions, a source of fluid, and means for connecting said source with said chamber including means for regulating the flow of fluid between said source and said chamber, said carrier and one of said supports constituting cooperating components, and one of said components having a bore extending substantially radially of said shell, said arresting means further comprising a piston fast with the other of said components and extending into said bore, and said chamber being defined by said piston and said one component and forming part of said bore.

2. The system of claim 1, wherein said shell is rotatable relative to said supports and said moving means comprises at least one row of first hydrostatic supporting elements interposed between said carrier and said shell adjacent said nip, at least one row of second hydrostatic supporting elements interposed between said carrier and said shell substantially opposite said row of first elements, and means for adjusting the supporting elements of at least one of said rows substantially radially of said shell.

3. The system of claim 2, wherein said shell has a cylindrical internal surface and each of said supporting elements has an external surface adjacent said internal surface, the external surfaces of at least some of said second supporting elements being smaller than the external surface of a first supporting element.

4. The system of claim 2, wherein the mutual spacing of neighboring second supporting elements in the respective row is greater than the mutual spacing of neighboring first supporting elements in the respective row.

5. The system of claim 1, further comprising a third roll, the other of said at least two rolls being disposed between said one roll and said third roll, said third roll comprising a second carrier, a second shell surrounding said second carrier and having first and second end portions, third and fourth annular supports interposed between the end portions of said second shell and said second carrier with freedom of movement relative to the second carrier substantially radially of said second shell between a plurality of different positions, and means for arresting said third and fourth supports in selected positions with reference to said second carrier.

6. The system of claim 1, wherein said arresting means comprises two chambers and the volume of one of said chambers increases while the volume of the other of said chambers decreases and vice versa, said connecting means including a discrete conduit for each of said chambers and said regulating means including at least one shutoff valve in each of said conduits.

7. The system of claim 1, wherein said regulating means comprises a shutoff valve operable to seal said source from said chamber; and further comprising means for refilling said chamber when the quantity of fluid in said chamber decreases while said valve seals the chamber from said source.

8. The system of claim 1 wherein said arresting means comprises an arresting unit for each of said supports.

9. The system of claim 1, wherein said connecting means further comprises a conduit between said source and said chamber, said regulating means including at least one shutoff valve in said conduit.

10. The system of claim 1, wherein said one component is said carrier.

11. A system of rolls, particularly for use in calenders, comprising at least two neighboring rolls defining an elongated nip, at least one of said rolls including an elongated carrier; a deformable hollow cylindrical shell rotatably surrounding and movable radially with reference to said carrier, said shell having first and second end portions; first and second annular supports interposed between said carrier and the respective end portions of said shell with freedom of movement jointly with such end portions relative to said carrier and radially of said shell between a plurality of different positions; means for moving said shell radially with reference to said carrier; and means for arresting said supports in selected positions with reference to said carrier, said arresting means comprising at least one chamber whose volume varies as a function of movements of said supports between said plurality of positions, a source of fluid, and means for connecting said source with said chamber, said connecting means including a conduit connecting said source with said chamber, a shutoff valve in said conduit, a source of reference signals denoting the desired pressure in said chamber, means for monitoring the pressure in said chamber and for generating second signals denoting the monitored pressure, means for comparing said second signals with said reference signals and for generating third signals denoting the differences between said reference signals and said second signals, and means for closing said valve in response to said third signals when the intensity of said second signals matches or exceeds the intensity of said reference signals and for opening said valve when the intensity of said second signals is less than the intensity of said reference signals.

12. The system of claim 11, wherein the intensity of said reference signals is variable and said connecting means includes means for opening said valve during varying of the intensity of said reference signals.

13. The system of claim 11, wherein said connecting means further comprises pressure regulating means in said conduit, said pressure regulating means being arranged to permit the flow of fluid from said source toward said chamber, at least while said shutoff valve is open, and to maintain the fluid which passes therethrough at a pressure denoted by said reference signals.

14. The system of claim 13, wherein said source comprises a pump and said pressure regulating means comprises a pressure relief valve in said conduit.

15. The system of claim 11, wherein said connectng means further comprises means for delaying the opening and closing of said valve in response to said third signals.

16. The system of claim 11, wherein said arresting means further comprises an accumulator of pressurized fluid communicating with said conduit intermediate said chamber and said monitoring means, said conduit including a first section between said chamber and said accumulator and a second section between said accumulator and said monitoring means, the resistance which said first section offers to the flow of fluid therein being less than the resistance of said second section.

17. The system of claim 16, wherein the capacity of said accumulator is less than 501 cm$^3$.

18. The system of claim 17, wherein the capacity of said accumulator is less than 201 cm$^3$.

19. The system of claim 11, wherein said arresting means comprises a first and a second chamber and the volume of said first chamber increases proportionally with a decrease of the volume of said second chamber in response to movement of said support relative to said carrier, said arresting means further comprising first and second conduits connecting said first and second chambers with said fluid source and first and second shutoff valves provided in said conduits; and further comprising discrete first and second means for refilling said chambers in response to leakage of fluid therefrom.

20. The system of claim 18, further comprising means for adjusting said first and second refilling means independently of one another so that the pressure in one of said chambers can exceed the pressure in the other of said chambers.

* * * * *